United States Patent
Barsness et al.

(10) Patent No.: US 8,818,955 B2
(45) Date of Patent: Aug. 26, 2014

(54) REDUCING STORAGE COSTS ASSOCIATED WITH BACKING UP A DATABASE

(75) Inventors: Eric L. Barsness, Pine Island, MN (US); David L. Darrington, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 12/947,893

(22) Filed: Nov. 17, 2010

(65) Prior Publication Data
US 2012/0124002 A1    May 17, 2012

(51) Int. Cl.
G06F 7/00 (2006.01)
G06F 17/30 (2006.01)
G06F 11/14 (2006.01)

(52) U.S. Cl.
CPC ...... *G06F 17/30147* (2013.01); *G06F 2201/80* (2013.01); *G06F 11/1469* (2013.01); *G06F 11/1451* (2013.01)
USPC .......................................................... 707/647

(58) Field of Classification Search
None
See application file for complete search history.

(56) References Cited

U.S. PATENT DOCUMENTS

| 8,099,391 | B1 * | 1/2012 | Monckton | 707/647 |
| 2005/0025058 | A1 * | 2/2005 | Chaudhuri et al. | 370/238 |
| 2006/0242205 | A1 * | 10/2006 | Schmidt et al. | 707/200 |
| 2007/0174325 | A1 * | 7/2007 | Mooney et al. | 707/102 |
| 2009/0083088 | A1 * | 3/2009 | Mathew et al. | 705/7 |
| 2010/0077160 | A1 * | 3/2010 | Liu et al. | 711/162 |
| 2011/0307675 | A1 * | 12/2011 | Kano | 711/162 |

* cited by examiner

*Primary Examiner* — Apu Mofiz
*Assistant Examiner* — Thu Nga Nguyen
(74) *Attorney, Agent, or Firm* — Patterson & Sheridan LLP (57) ABSTRACT

Techniques are disclosed for backing up and/or restoring data. In one embodiment, a request is received to back up at least a first unit of data stored in a database. Upon determining that the first unit of data is at least partially derived from a second unit of data stored in the database, a backup may be generated that includes less than all of the first unit of data. Subsequently, the first unit of data may be fully restored from the backup.

20 Claims, 4 Drawing Sheets

| FIRST NAME | LAST NAME | DATE OF BIRTH | INITIALS | AGE | AGE GROUP |
|---|---|---|---|---|---|
| ALICE | SMITH | JAN - 1 - 2000 | A S | 10 | CHILD |
| BOB | WHITE | FEB - 1 - 1990 | B W | 20 | ADULT |
| CHARLIE | JONES | MAR - 1 - 1980 | C J | 30 | ADULT |

FIG. 3

```
<DerivedField>   ~ 302_1
  <Name>Customer.Initials</Name>   ~ 304_1
  <Derivation>FirstLetter(Customer.First Name)+FirstLetter(Customer.Last Name)</Derivation>   ~ 306_1
</DerivedField>

<DerivedField>   ~ 302_2
  <Name>Customer.Age</Name>   ~ 304_2
  <Derivation>CurrentDate( ) - Customer.DateofBirth </Derivation>   ~ 306_2
</DerivedField>

<DerivedField>   ~ 302_3
  <Name>Customer.AgeGroup </Name>   ~ 304_3
  <Derivation> If (CurrentDate( )-Customer.DateofBirth >=18) Then "ADULT" Else "CHILD"  </Derivation>   ~ 306_3
</DerivedField>
```

| FIRST NAME | LAST NAME | DATE OF BIRTH |
|---|---|---|
| ALICE | SMITH | JAN - 1 - 2000 |
| BOB | WHITE | FEB - 1 - 1990 |
| CHARLIE | JONES | MAR - 1 - 1980 |

REDUCING STORAGE COSTS ASSOCIATED WITH BACKING UP A DATABASE

BACKGROUND

Databases are computerized information storage and retrieval systems. The most prevalent type of database is the relational database, a tabular database in which data is defined so that it can be reorganized and accessed in a number of different ways.

Regardless of the particular architecture, in a database management system (DBMS), a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

SUMMARY

Embodiments of the invention provide a computer-implemented method, computer program product, and system for performing an operation that includes receiving a first request to back up at least a first unit of data stored in a database. The operation also includes generating a backup of: (i) less than all of the first unit of data and (ii) at least part of the second unit of data, responsive to the first request and a determination that the first unit of data is, at least in part, derived from a second unit of data stored in the database. The operation also includes receiving a second request to restore at least the first unit of data from the backup. The operation also includes restoring all of the first unit of data from the backup, based on a predefined relationship between the first unit of data and the second unit of data and responsive to the second request.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally provide techniques for backing up data stored in a database. One embodiment provides an application for backing up the data that is stored in the database. The application receives a request to back up at least a first unit of data—such as a first column of data—stored in the database. In other embodiments, a unit of data may be a row of data, a table of data, a cell of data, etc. The application determines that the first column of data is at least partially derived from a second column of data stored in the database. This determination may be made based on one or more properties of a column that are input by an administrative user of the database. For example, the one or more properties of the column may include: (i) a first property indicating whether the first column of data is a derived column, (ii) a second property identifying the second column, and (iii) a third property indicating how to derive the first column of data from the second column of data. The property of the column may be stored, without limitation, as part of a schema of the database or as one or more files external to the database.

In one embodiment, responsive to the request, the application may generate a backup of: (i) less than all of the first column of data and (ii) at least part of the second column of data. Depending on the embodiment, the backup may also include the property of the column. Subsequently, the application may restore all of the first column of data from the backup, despite the backup containing less than all of the first column of data. At least in some cases, any cost incurred in having to derive the first column of data and/or having to back up the property of the column is outweighed by cost savings achieved from not having to include all of the first column of data in the backup. For example, the cost savings may be substantial in cases where a large number of records are involved and/or where the first column is mostly—or even entirely—derived from the second column. Further, the application provides the administrative user with improved control and flexibility in making tradeoffs between minimizing storage space occupied by the backup and minimizing processing time incurred from deriving columns during a restore operation. For example, the techniques herein may be used to back up data in cases where minimizing storage space is more desirable than minimizing processing time.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., database-as-a-service) or related data available in the cloud. For example, a database backup application could execute on a computing system in the cloud and perform backups of a relational database using the techniques described herein. In such a case, the database backup application could store the backups at a storage location in the cloud. Doing so allows the backing up of information that is accessible from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
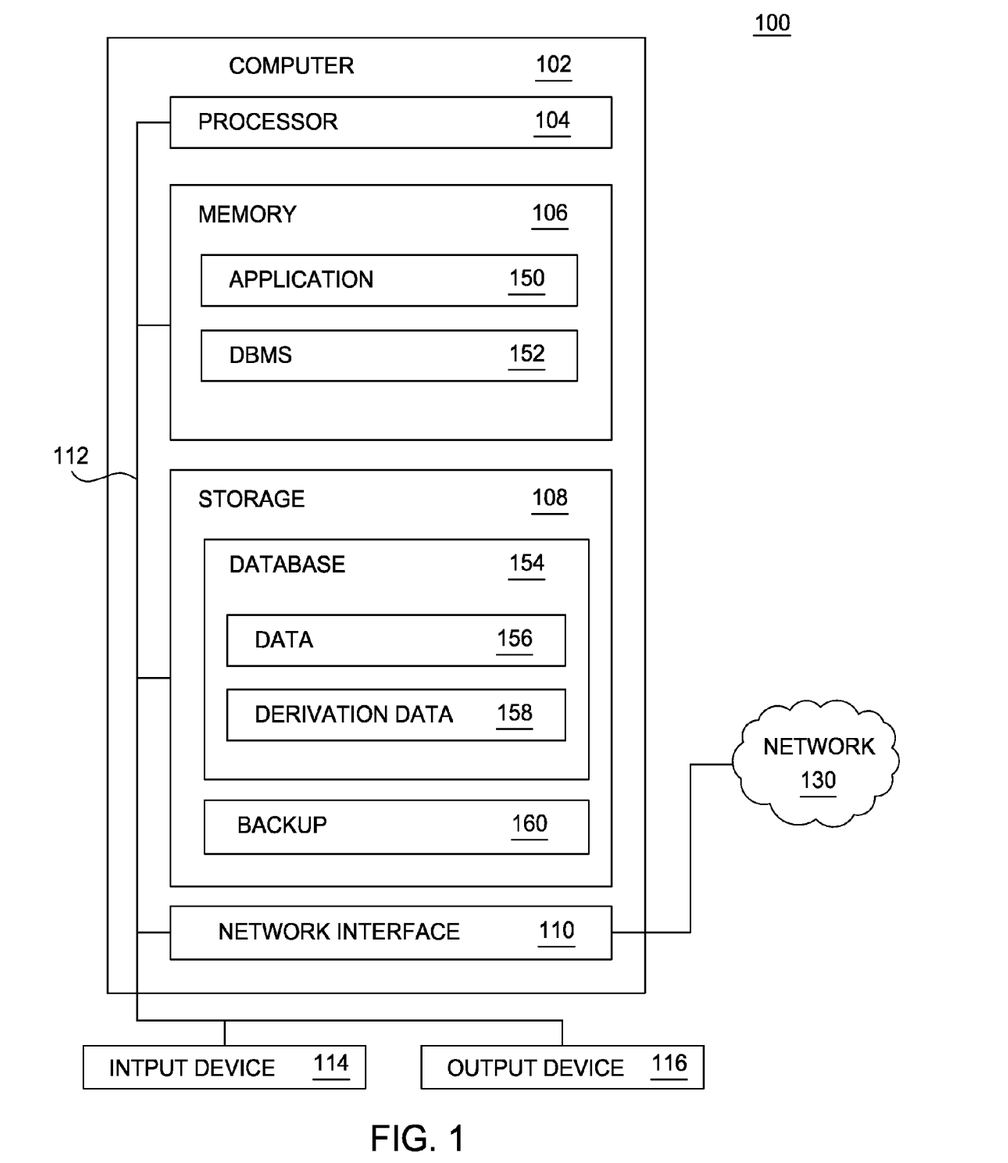
FIG. 1 is a block diagram illustrating a system for backing up and/or restoring data in a database, according to one embodiment of the invention.

FIG. 1 is a block diagram illustrating a system 100 for backing up and/or restoring data in a database, according to one embodiment of the invention. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 and a DBMS 152. The storage 108 of the computer 102 includes a database 154, which is managed by the DBMS 152. In one embodiment, the database 154 is a relational database. The database 154 stores data 156 and derivation data 158. The derivation data 158 may be any information that indicates whether (and/or how) a first unit of the data 156 is derived from a second unit of the data 156. Each unit of the data 156 may be, without limitation, a row, a column, a table, etc. The application 150 is configured to access the data 156, to create backups of the accessed data responsive to a request. The request may be in the form of a user command, a scheduled job, a request from a different application and via an application programming interface (API) provided by the application 150, and the like. Depending on the embodiment, some or all of the functionality of the application 150 may be integrated into the DBMS 152. Further, although the application 150 is shown to be executing on the computer 102, in another embodiment, the application 150 executes on a different computer that communicates with the computer 102 via the network 130.

Figure 2:
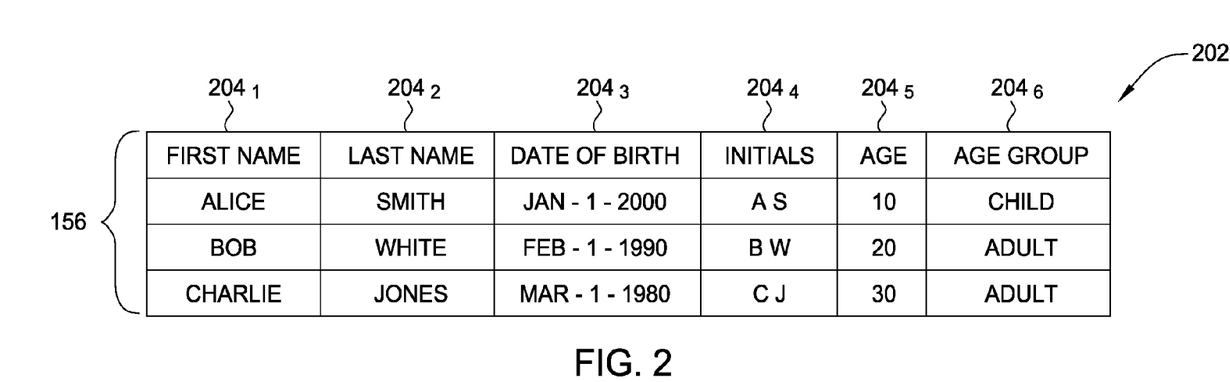
FIG. 2 illustrates data stored in the database, according to one embodiment of the invention.

FIG. 2 illustrates the data 156 stored in the database 154 of FIG. 1, according to one embodiment of the invention. In this particular example, the data 156 is assumed to be stored as part of a customer table 202 in the database 154. Suppose the application 150 receives a request to back up the customer table 202. As shown, the data 156 is organized in the form of columns 204. The columns 204 include a first name column $204_1$, a last name column $204_2$, a date of birth column $204_3$, an initials column $204_4$, an age column $204_5$, and an age group column $204_6$. For simplicity, the data 156 is shown to include only three records, and those skilled in the art will recognize that the data 156 may include more records than shown. The data for a first customer, Alice Smith, indicates that Alice was born on Jan. 1, 2000, that Alice has initials "AS", that Alice is ten years old, and that Alice is classified as a "Child". The data for a second customer, Bob White, indicates that Bob was born on Feb. 1, 1990, that Bob is twenty years old, and that Bob is classified as an "Adult". The data for a third customer, Charlie Jones, indicates that Charlie was born on Mar. 1, 1980, that Charlie is thirty years old, and that Charlie is classified as an "Adult".

In one embodiment, the application 150 identifies one or more derived columns of the data 156, based on the derivation data 158. In this way, the provision of the derivation data 158 facilitates a more effective backup. That is, the application 150 may back up a subset of the columns of the data 156—rather than backing up all of the columns of the data 156 by using the derivation data 158 to identify derived columns of the data 156. In other words, one or more columns of the data 156 may be partially or fully excluded from the backup, because the one or more columns of the data 156 may be derived from other columns of the data 156. Put another way, any columns that are excluded from the backup may be reconstructed from the data contained in the backup, based on the derivation data 158.

Figure 3:
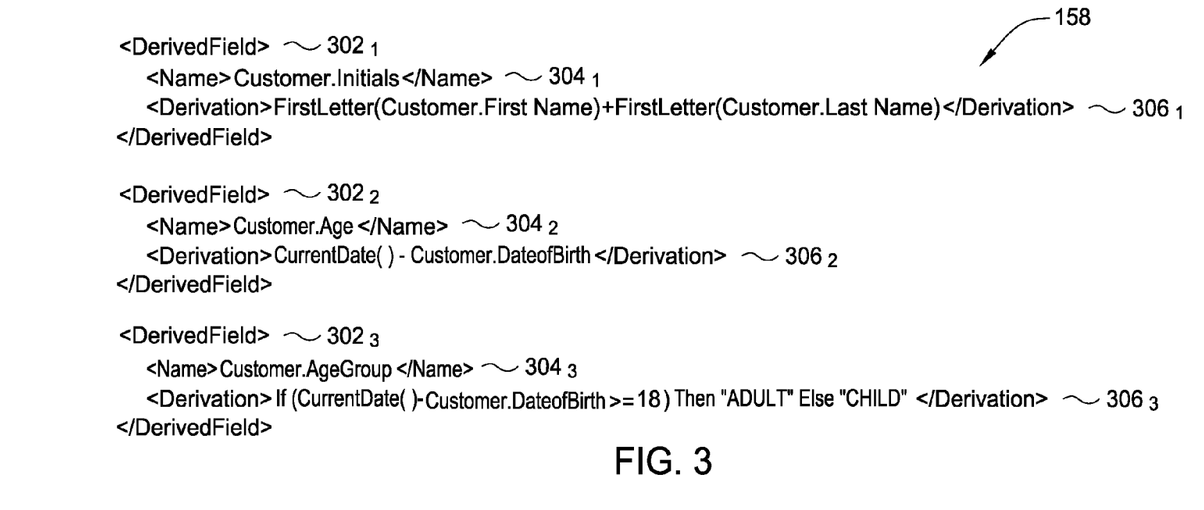
FIG. 3 illustrates derivation data, according to one embodiment of the invention.

FIG. 3 illustrates the derivation data 158 of FIG. 1, according to one embodiment of the invention. As shown, the derivation data 158 is represented in XML format and may be stored as one or more files in a file system. In other embodiments, the derivation data 158 may be stored as part of a schema of the database 154. The derivation data 158 includes an entry 302 for each derived field in the database 154. In other embodiments, the derivation data 158 includes an entry 302 for each field—derived or not—in the database 154, and each entry includes a flag indicating whether the respective field is a derived field. Each entry 302 includes a name sub-field 304 and a derivation sub-field 306. The name sub-field 304 identifies the name of the derived field, and the derivation sub-field 306 specifies how the field is derived from other fields in the database, thereby establishing a predefined relationship between a column of data stored for the field and columns of data stored for the other fields.

In one embodiment, the derivation may be provided by the administrative user in the form of an expression according to a predefined language that is supported by the application 150. The expression may represent the column of data as a deterministic function of one or more other columns of data in the database 154. The predefined language may be any conventional or custom query language, scripting language, programming language, etc. Alternatively, the derivation may sufficiently describe the predefined relationship using a natural language, to allow a database administrator to provide a suitable expression at a subsequent time, e.g., at a time that the data 156 is restored from the backup 160. For example, the derivation may be expressed in the form of prose in the English language. Further, to distinguish different types of derivations from one another, each derivation may be qualified by a derivation type field that indicates the language of the respective derivation (e.g., SQL, Perl, English prose, etc.). As is known, Perl is a general-purpose scripting language for formatting and/or reporting data.

As shown, the derivation data 158 includes a first entry $302_1$ indicating that the initials field $204_4$ is derived by concatenating the first letter of the first name field $204_1$ and the first letter of the last name field $204_2$. The derivation data 158 also includes a second entry $302_2$ indicating that the age field $204_5$ is derived by subtracting the date of birth field $204_3$ from the current date. The derivation data 158 also includes a third entry $302_3$ indicating that the age group field $204_6$ is derived from whether the date of birth field $204_3$ for a given record contains a value that is greater than or equal to eighteen. If so, the age group field $204_6$ stores the string "Child"; otherwise, the age group field $204_6$ stores the string "Adult".

While embodiments are described herein with reference to each entry 302 of the derivation data 158 having a name sub-field and a derivation sub-field, other fields are broadly contemplated. For example, in one embodiment, each entry 302 includes additional fields indicating whether a column is only partially (rather than fully) derived from another column. Further, types of fields other than derived fields are broadly contemplated. For example, in one embodiment, the derivation data 158 may include entries for one or more "excluded" fields. An excluded field represents a field that the administrative user has previously specified should not be included in a backup—regardless of whether the excluded field can be derived from other fields in the data 156. Accordingly, when generating the backup 160 of the data 156, the application 150 omits the excluded fields—as well as the derived fields—from the backup 160.

Still other embodiments of the derivation data 158 are broadly contemplated. In one embodiment, the derivation data 158 may also include global properties—i.e., properties that are not specific to any column entry. For example, the derivation data 158 may include a first global property that specifies whether to back up associated XML documents. The derivation data 158 may also include a second global property that specifies whether to store character large object (CLOB) and/or binary large object (BLOB) fields. Further, in some embodiments, each column entry further includes a first sub-field specifying whether to back up indexes for the respective column. The entry for each column may also include a second sub-field specifying whether the respective column is a translation from a different column (e.g., from English to Spanish). The entry for each column may also include a third sub-field specifying whether to back up metadata associated with the respective column. The metadata may include a revision history for the respective column, an access history for the respective column, and/or security flags associated with the respective column. The revision history stores values in the respective column as the values change over time. The access history stores user identifiers and timestamps associated with each access of the respective column. The security flags specify the security privileges required for accessing the respective column.

Figure 4:
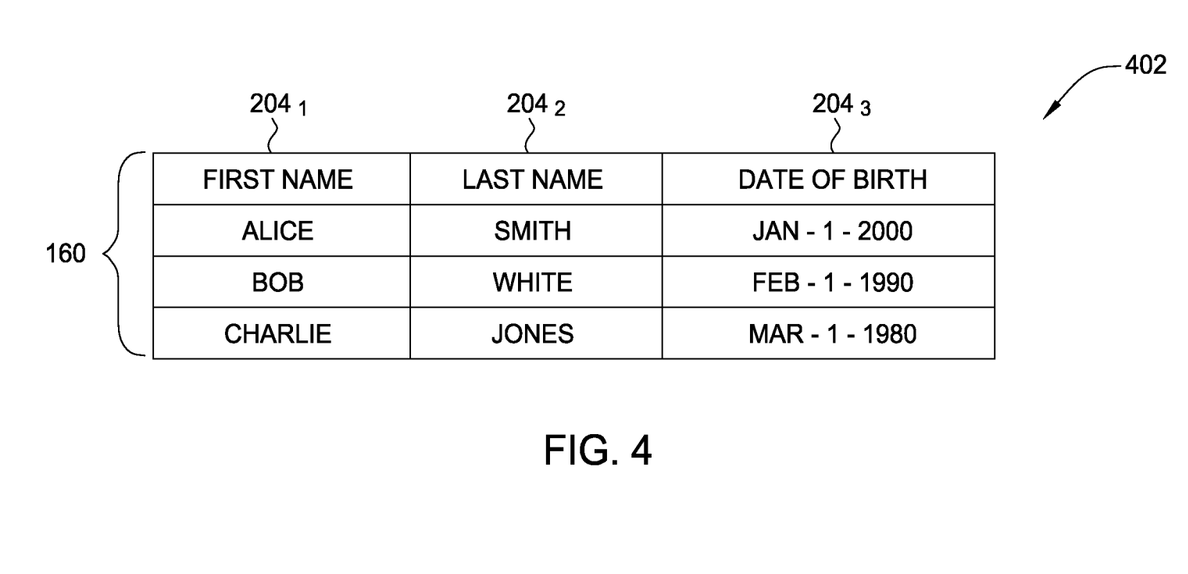
FIG. 4 illustrates a subset of data that is included in a backup, according to one embodiment of the invention.

FIG. 4 illustrates the subset 402 of the data 156 that is included in the backup 160 generated by the application 150 of FIG. 1, according to one embodiment of the invention. As shown, the backup 160 includes the first name column $204_1$, the last name column $204_2$, and the date of birth column $204_3$, but does not include the initials column $204_4$, the age column $204_5$, or the age group column $204_6$. As described above, the application determines which columns to include based on the derivation data 158. Further, depending on the embodiment, the backup 160 may compress the subset of the data 156 using conventional data compression techniques, such as Lempel-Ziv (LZ) compression. As is known, Lempel-Ziv compression refers to a class of algorithms for lossless data compression.

Assume that the application 150 subsequently receives a request to restore the customer table 202 from the backup 160. In response to the request, the application 150 retrieves and/or decompresses data for the first name column $204_1$, the last name column $204_2$, and the date of birth column $204_3$, respectively from the backup 160. The application 150 then derives the remaining columns $204_{4-6}$ based on the retrieved columns $204_{1-3}$ and the derivation data 158. For example, the application 150 derives the initials column $204_4$ by concatenating the first letter of the first name column $204_1$ with the first letter of the last name column $204_2$—in accordance with the corresponding entry for the initials column $204_4$ in the derivation data 158. Similarly, the application 150 derives the age column $204_5$ by subtracting the date of birth column $204_3$ from the current date. The application 150 also derives the age group column $204_6$ by computing age values from the date of birth column $204_3$ and then converting each age value to either "Adult" or "Child", in accordance with the derivation sub-field $306_3$ of the derivation entry for the age group column $204_6$. Alternatively, the application 150 may convert each value in the age column $204_5$ to either "Adult" or "Child", in accordance with the derivation sub-field $306_3$.

Advantageously, the application 150 may fully restore the data 156 in the customer table 202 of FIG. 2, while storing only a subset of the data 156 in the backup 160 of the customer table 202, thereby reducing the space required for storing the backup 160 in at least some cases. Further, the application 150 provides the administrative user with improved control and flexibility in making tradeoffs between minimizing storage space occupied by the backup and minimizing processing time incurred from deriving columns during a restore operation.

In some embodiments, the techniques herein may also be applied to a database that is mirrored across at least a primary server and a secondary server, such as in a high-availability environment. In one embodiment, to apply to the secondary server changes that have occurred on the primary server, the application 150 generates a backup from the primary server, where the backup includes new and/or modified data records. In an alternative embodiment, instead of including the modified data records, the backup includes delta values that only represent changes to the data records being modified. In either case, the backup may at least partially omit one or more derived columns (or the delta values thereof). The application 150 may then restore the data records to the secondary server, using the generated backup and in accordance with the techniques described above. Accordingly, the secondary server is updated with the new and/or modified data records, including all of the derived columns and despite using a backup file that at least partially omits at least one of the derived columns (or the delta values thereof). Advantageously, the storage space and/or network bandwidth required for synchronizing the primary server and the secondary server may be reduced in at least some cases. The network bandwidth is reduced because the omitted and/or partially-omitted derived columns need not be transmitted over the network from the primary server to the secondary server.

Further, although the backup and restore operations are described with reference to a single instance of the application 150, those skilled in the art will recognize that in other embodiments, some or all of the functionality of the application 150 may be performed by a respective instance of the application 150 (or of the DBMS 152), executing on each of the primary server and the secondary server.

Figure 5:
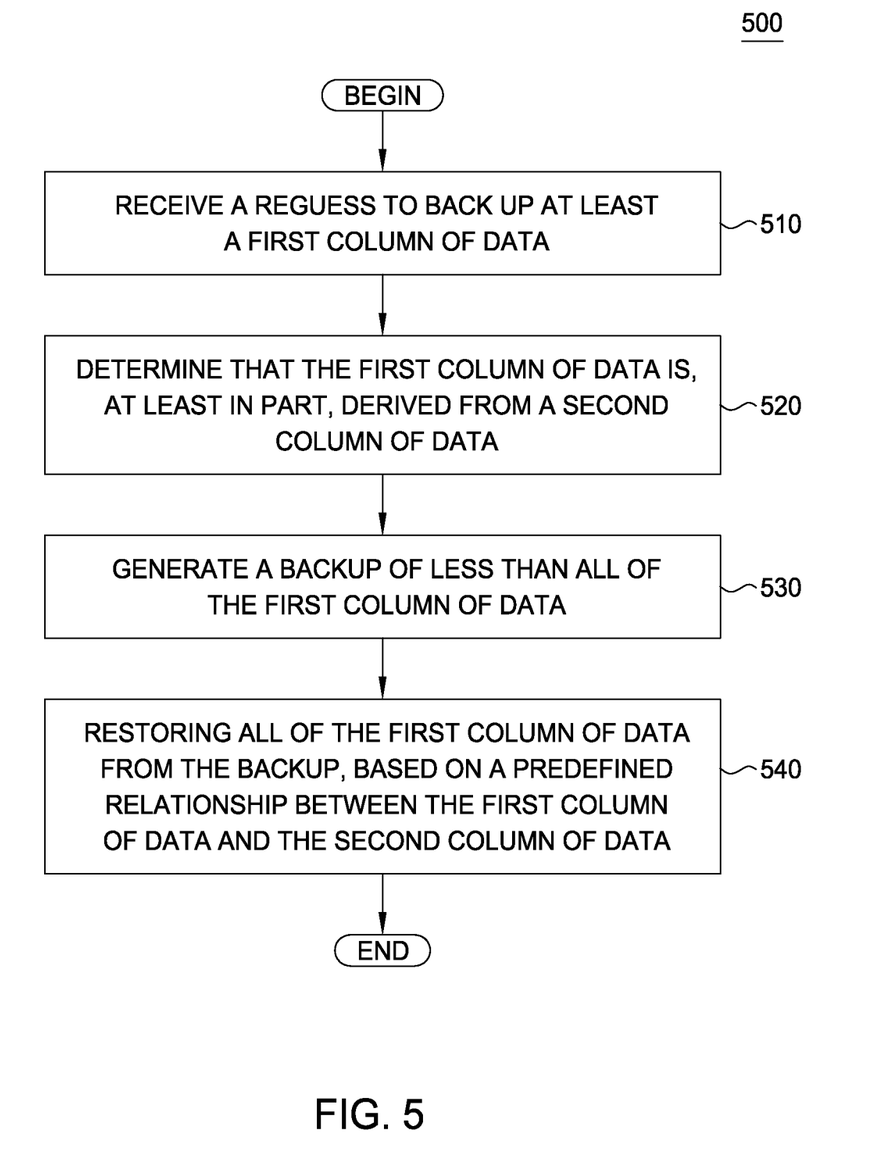
FIG. 5 is a flowchart depicting a method for backup up and restoring the data, according to one embodiment of the invention.

FIG. 5 is a flowchart depicting a method 500 for backing up and restoring the data 156 of FIG. 1, according to one embodiment of the invention. As shown, the method 500 begins at step 510, where the application 150 receives a request to back up at least a first column of data that is stored in a database. For example, the application 150 receives a request to back up the data 156 stored in the customer table 202 of FIG. 2. In an alternative embodiment, the application 150 receives a request to back up the first column of data that is stored in the database, and the request does not specify to back up a second column of data. At step 520, the application 150 determines that the first column of data is at least partially derived from the second column of data. As described above, this determination may be made based on the derivation data 158 of FIG. 3. Based on the derivation data, the application 150 may determine, for instance, that the age group column $204_6$ is derived from the age column $204_5$ (or, alternatively, from the date of birth column $204_3$).

At step 530, the application 150 generates a backup that includes less than all of the first column of data. For example, the application 150 generates a backup that includes the date of birth column $204_3$ but does not include the initials column $204_4$. At step 540, the application 150 restores all of the first column of data from the backup, based on a predefined relationship between the first column of data and the second column of data. As described above, the predefined relationship may be specified by the administrative user in a sub-field of an entry in the derivation data 158 for the first column of data. The application 150 may perform the restore responsive to receiving a request to restore the data from the backup. After the step 540, the method 500 terminates.

Advantageously, embodiments of the invention provide an application for backing up data and/or restoring data in a database. In one embodiment, the application receives a request to back up at least a first unit of data in the database. The application determines that the first unit of data is at least partially derived from a second unit of data in the database. Accordingly, the application generates a backup that includes less than all of the first unit of data. Subsequently, the application restores all of the first unit of data from the backup, despite the backup including less than all of the first unit of data. Advantageously, the storage space required for storing the backup is reduced in at least some cases.

While the foregoing is directed to embodiments of the present invention, other and further embodiments of the invention may be devised without departing from the basic scope thereof, and the scope thereof is determined by the claims that follow.

What is claimed is:

1. A computer-implemented method to reduce storage costs associated with backing up a database, based on derivation functions, the method comprising:
    receiving a first request to back up at least a first unit of data stored in the database;
    responsive to the first request and a determination that the first unit of data is, at least in part, derived from a second unit of data stored in the database, generating a backup of the second unit of data and not of the first unit of data, wherein each of the first unit of data and the second unit of data is contained in a respective, distinct column in the database, wherein the second unit of data is not identical to the first unit of data;
    retrieving a first derivation function of the derivation functions, specifying how to derive the first unit of data based on the second unit of data; and
    responsive to a second request to restore at least the first unit of data and by operation of one or more computer processors, restoring the first unit of data from the backup of the second unit of data, based on the first derivation function and not based on any backup of the first unit of data.

2. The computer-implemented method of claim 1, wherein the first unit of data is in whole derived from at least part of the second unit of data, and wherein the backup of only the at least part of the second unit of data is generated.

3. The computer-implemented method of claim 1, wherein the first unit of data is only in part derived from at least part of the second unit of data, and wherein the backup of the at least part of the second unit of data and a non-derived part of the first unit of data is generated.

4. The computer-implemented method of claim 1, wherein each unit of data comprises a column of data, and wherein the first derivation function is specified by a user.

5. The computer-implemented method of claim 1, wherein the database is mirrored across a primary server and a secondary server, wherein the backup is generated from the primary server and includes at least one of new data records and changed data records, and wherein all of the first unit of data is restored onto the secondary server, thereby synchronizing data changes in the primary server with the secondary server without requiring the backup to include all of the first unit of data from the primary server.

6. A non-transitory computer-readable medium containing a program which, when executed, performs an operation to reduce storage costs associated with backing up a database, based on derivation functions, the operation comprising:
    receiving a first request to back up at least a first unit of data stored in the database;
    responsive to the first request and a determination that the first unit of data is, at least in part, derived from a second unit of data stored in the database, generating a backup of the second unit of data and not of the first unit of data, wherein each of the first unit of data and the second unit of data is contained in a respective, distinct column in the database, wherein the second unit of data is not identical to the first unit of data;
    retrieving a first derivation function of the derivation functions, specifying how to derive the first unit of data based on the second unit of data; and
    responsive to a second request to restore at least the first unit of data and by operation of one or more computer processors when executing the program, restoring the first unit of data from the backup of the second unit of data, based on the first derivation function and not based on any backup of the first unit of data.

7. The non-transitory computer-readable medium of claim 6, wherein the first unit of data is in whole derived from at least part of the second unit of data, and wherein the backup of only the at least part of the second unit of data is generated.

8. The non-transitory computer-readable medium of claim 6, wherein the first unit of data is only in part derived from at least part of the second unit of data, and wherein the backup of the at least part of the second unit of data and a non-derived part of the first unit of data is generated.

9. The non-transitory computer-readable medium of claim 6, wherein each unit of data comprises a column of data, wherein the first derivation function is specified by a user.

10. The non-transitory computer-readable medium of claim 6, wherein the database is mirrored across a primary server and a secondary server, wherein the backup is generated from the primary server and includes at least one of new data records and changed data records, and wherein all of the first unit of data is restored onto the secondary server, thereby synchronizing data changes in the primary server with the secondary server without requiring the backup to include all of the first unit of data from the primary server.

11. A system to reduce storage costs associated with backing up a database, based on derivation functions, the system comprising:
    one or more computer processors; and
    a memory containing a program, which when executed by the one or more computer processors is configured to perform an operation comprising:
        receiving a first request to back up at least a first unit of data stored in the database;
        responsive to the first request and a determination that the first unit of data is, at least in part, derived from a second unit of data stored in the database, generating a backup of the second unit of data and not of the first unit of data, wherein each of the first unit of data and the second unit of data is contained in a respective, distinct column in the database, wherein the second unit of data is not identical to the first unit of data;
        retrieving a first derivation function of the derivation functions, specifying how to derive the first unit of data based on the second unit of data; and
        responsive to a second request to restore at least the first unit of data, restoring the first unit of data from the backup of the second unit of data, based on the first derivation function and not based on any backup of the first unit of data.

12. The system of claim 11, wherein the first unit of data is in whole derived from at least part of the second unit of data, and wherein the backup of only the at least part of the second unit of data is generated.

13. The system of claim 11, wherein the first unit of data is only in part derived from at least part of the second unit of data, and wherein the backup of the at least part of the second unit of data and a non-derived part of the first unit of data is generated.

14. The system of claim 11, wherein the database is mirrored across a primary server and a secondary server, wherein the backup is generated from the primary server and includes at least one of new data records and changed data records, and wherein all of the first unit of data is restored onto the secondary server, thereby synchronizing data changes in the primary server with the secondary server without requiring the backup to include all of the first unit of data from the primary server.

15. The computer-implemented method of claim 1, wherein the first unit of data is stored in a first column of the database, wherein the second unit of data is stored in a second column of the database, wherein the first derivation function is stored as a property of at least one of the first column and the second column in the database, wherein the predefined relationship is specified by a user, wherein the user comprises an administrator of the database, wherein the method is to avoid incurrence of any storage cost from generating a backup of the first unit of data, that is beyond a storage cost incurred in storing the second unit of data and the first derivation function.

16. The computer-implemented method of claim 15, wherein the method is performed by a database management system for the database, wherein the database management system is configured to:
    generate the backup when the first unit of data is in whole derived from the at least part of the second unit of data, wherein the backup of only the at least part of the second unit of data is generated; and
    generate the backup when the first unit of data is only in part derived from the at least part of the second unit of data, wherein the backup of the at least part of the second unit of data and a non-derived part of the first unit of data is generated.

17. The computer-implemented method of claim 16, wherein the database is mirrored across a primary server and a secondary server, wherein the backup is generated from the primary server and includes at least one of new data records and changed data records, and wherein all of the first unit of data is restored onto the secondary server, thereby synchronizing data changes in the primary server with the secondary server without requiring the backup to include all of the first unit of data from the primary server.

18. The computer-implemented method of claim 17, wherein the predefined relationship is specified by the user in the form of derivation data, wherein the derivation data is expressed in a predefined programming language supported by the database management system, wherein the method further comprises:
    receiving the derivation data; and
    programmatically determining that the first unit of data is, at least in part, derived from the second unit of data, based on the derivation data.

19. The computer-implemented method of claim 18, wherein the derivation data is formatted according to a predefined markup language, wherein the predefined markup language is different from the predefined programming language, wherein the derivation data includes a plurality of derived field definitions, wherein each derived field definition specifies a field name and a corresponding field derivation, wherein each field derivation includes a distinct, deterministic function for deriving a target column from a source column.

20. The computer-implemented method of claim 19, wherein a third unit of data is restored from the backup, based on a predefined relationship specifying how to derive the third unit of data from the first unit of data, wherein the third unit of data is not identical to the second unit of data, wherein the third unit of data is not identical to the first unit of data, wherein each of the first unit of data, the second unit of data, and the third unit of data are stored in a respective, distinct column in the database.

* * * * *